United States Patent
Kleinöder et al.

(10) Patent No.: US 6,700,967 B2
(45) Date of Patent: Mar. 2, 2004

(54) PRESENCE INFORMATION METHOD AND SYSTEM

(75) Inventors: Wolfgang B. Kleinöder, Richterswil (CH); Hong Linh Truong, Richterswil (CH); Lucas S. Heusler, Zurich (CH); Yann Duponchel, Adliswil (CH); Marcel Graf, Kilchberg (CH); Gabriel Dermler, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/855,302

(22) Filed: May 15, 2001

(65) Prior Publication Data

US 2001/0053214 A1 Dec. 20, 2001

(30) Foreign Application Priority Data

May 17, 2000 (EP) ............................................ 00110502

(51) Int. Cl.[7] ................................................. H04M 3/42
(52) U.S. Cl. ................................. 379/201.1; 379/265.1; 379/265.11; 379/201.02; 379/201.06; 379/201.1
(58) Field of Search ........................ 379/265.1, 265.11, 379/201.02, 201.06, 201.1

(56) References Cited

U.S. PATENT DOCUMENTS 6,330,325 B1 * 12/2001 Reid et al. ............. 379/265.01
6,463,142 B1 * 10/2002 Kilp ....................... 379/201.06
6,487,290 B1 * 11/2002 Le Grand ............... 379/265.02

OTHER PUBLICATIONS

Standard ECMA–185, 2nd Edition—Jun. 1997; ECMA Standardizing—Information—and —Communication—Systems. Private Integrated Services Network(PISN); Specification, Funcational Model and Information Flows—Call Completion Supplementary services. Phone:+41 22 849.60.00—Fax:+41 22 849.60.01—URL: http://www.ecma.ch–Internet: helpdesk@ecma,ch.

International Telecommunication Union, ITU–T H.323(Sep. 1999) Series H: Audiovisual and Multimedia Systems, Infrastructure of audiovisual services—Systems and terminal equipment for audiovisual services, Packet–based multimedia communications systems; ITU–T recommendation H.323(Previously CCITT Recommendation).

* cited by examiner

*Primary Examiner*—Ahmad F. Matar
*Assistant Examiner*—Rasha S Al-Aubaidi
(74) *Attorney, Agent, or Firm*—Louis P Herzberg

(57) ABSTRACT

A method of operating an availability service in a telecommunication system interconnecting a legacy telephone system with at least one presence system, said legacy telephone system including a plurality of terminals ($T_1 \ldots T_{10}$), at least some ($T_1, T_2$) of which are terminals of subscribers to said availability service, said method including:

(a) continuously monitoring each subscriber terminal ($T_1$, $T_2$) for a change of a call status of said subscriber terminal from the presence of a call to the absence of a call;
(b) generating a first or "high availability" signal when said call status of said subscriber terminal changes from said presence of a call into said absence of a call;
(c) monitoring an interval of time beginning with said first signal;
(d) generating a second or "availability unknown" signal after a predetermined time period τ within said interval; and
(e) making said availability signals accessible to any interconnected presence system.

12 Claims, 2 Drawing Sheets

PRESENCE INFORMATION METHOD AND SYSTEM

CROSS REFERENCES

The present application is related to the following application even dated herewith: patent application Ser. No. 09/855,303, entitled, "Teleconferencing System and Method," by inventors Y. Duponchel et al., which is incorporated herein by reference in entirety for all purposes.

FIELD OF THE INVENTION

The present invention is directed to a method and a system permitting a user of a legacy telephone system, i.e. a Public Service Telephone System (PSTN), an Integrated Service Digital Network (ISDN), or a Mobile telephony system (MTS), to publish information about his or her presence or availability in an interconnected presence system, for example and preferably to an Internet presence service.

PRIOR ART

In the environment of telephony there is a strong interest in making a call succeed, not only from a user's point of view—he/she wants to communicate with another user—but also from that of the service provider, i.e. the need to generate revenue. There is also an interest in preventing unsuccessful calls. Having a calling user re-dial a number again and again—either because the called user is busy or because he/she does not answer—is unproductive, because unsuccessful call attempts are usually not charged although they consume a lot of network resources.

Several supplementary services could be available to help a calling user in the cases mentioned above, such as among others, Completion of Call to Busy Subscriber (CCBS), Completion of Call on No Reply (CCNR), call back, etc.

To implement those services, the system usually monitors the status of the called user and automatically retries the call when the called user is no longer busy (in case of CCBS) or when the called user is available again (in case of CCNR).

However, there is substantially no deployment of such supplementary services in public telephone networks because these services would require complicated interaction between the users and the switches, and between the switches themselves. Even in a more modern Private Branch eXchange (PBX) environment it does happen that such services are offered only to those users that are connected to the same PBX.

"Presence" is a mode of communication that has recently become popular in the Internet. It is a service that allows a user "A" to declare his interest in the presence or availability information of another user "B". User "A" is said to subscribe to the "presence information" of user "B". The terminal of user "B" publishes "presence information" about user "B". The service delivers notifications to "A" each time the "presence information" of "B" changes.

In connection with the Internet, for example, "presence information" about a user is information about the user's presence or—in a more restricted sense—about his/her degree of availability for interaction with the telecommunication system. For example, such information may include whether or not the user is active in the Internet.

AIMS AND OBJECTS OF THE INVENTION

However, to the best of applicant's knowledge, it is not possible, at present, for a user of an Internet presence service to obtain similar or equivalent presence information about a user of a legacy telephone system.

Accordingly, it is an object of the invention to provide for a method and system for providing an indication of availability of a user of a legacy telephone system to a user of an interconnected presence service, e.g. an Internet presence system.

More specifically, the present invention aims at providing a method and system that permits a user of a legacy telephone system to publish information about her/his availability for communication with other users of any interconnected presence system, e.g. such that an Internet user who has subscribed to the availability information of a legacy telephone user could then be notified about the availability of such user.

BRIEF SUMMARY OF THE INVENTION

This object and further advantages will achieved, according to a first general embodiment of the invention by a method of operating an availability service as specified in claims 1 and 12; preferred embodiments of the inventive method are as defined in the claims.

According to a second general embodiment, the invention provides for a system of operating an availability service as specified in claim 6; preferred embodiments of the inventive method are as defined in the claims.

According to a third general embodiment, the invention provides for an availability service program for implementing operation of an availability service as specified in claim 10.

According to a further embodiment, the invention provides for a module as specified in claim 11 for operating an availability service.

DEFINITION OF TERMS AND DISCUSSION OF PREFERRED EMBODIMENTS

Generally, legacy telephone systems collect presence information about their users but for internal purposes and without offering a presence service to their users: For example, a PSTN is able to monitor the status of a telephone line of a subscriber and determine whether the user is busy or not. The event that a telephone line goes from busy state to free state is a piece of presence information for use according to the invention. It is of interest because it indicates that during a subsequent period of time, e.g. the next couple of seconds or minutes, there is a high likelihood that the user is able to answer a call.

Further, networks for mobile telephony provide a procedure for the mobile telephones to register with the base station before the mobile telephone can make or receive a call. The network keeps track of the registration status. The fact that a mobile telephone is registered and not involved in a call also is another piece of information for use in the present invention. It is of interest because it indicates that there is a high likelihood that the user is able to answer a call.

Generally speaking, a PTSN user is either busy or not. For the present invention, a signal indicating transition from busy to not busy indicates that during a subsequent period of time τ, there is a relatively high probability that the user will answer an incoming call and is present in the sense of the invention. It should be noted, however, that the term "presence of a user" does not necessarily imply actual physical presence but, rather, an indication of "availability" of a user. This distinction is of importance because "presence" is a "digital" concept in that a user is either present, or he is not present. "Availability", on the other hand, could be said to be "graded" so that the a certain degree of a user's availability could be defined, e.g. a "high", "medium" or "low" degree of availability. For this reason, the term "availability signal" rather than "presence signal" is used herein even though both terms could be used synonymously as well.

The following terms and concepts are used herein to define the presence or availability status of a PSTN:

"Busy": a signal indicating that the user is currently involved in a call.

"Probably Available": a signal indicating that the user has just been involved in a call and is now free, and that it is probable that the user will answer an incoming call. This state or signal is termed a "high availability" state or signal, respectively, and will change into "availability unknown" after a certain time period "τ" as defined below. Hence, "Availability Unknown" is the state or signal indicating that the user has not been busy for a period of time>τ.

The time period τ is a configurable variable of the system according to the invention and can vary between minutes to hours. It is intended to characterize the fact that the longer a user is not busy, the smaller is the probability that he will be available for respond to an incoming call.

Additionally, the system or user may be provided with a means for "resetting" the user's status to "unknown"; for example, the user may generate a specific signal, e.g. dial a certain code which is reserved for that purpose.

An important advantage of the presence or availability status that can be published by means of a system or method according to the invention is that the user can influence his status via a very simple interface: he can move his status to the state "probably available" by briefly picking up his telephone handset. There is no need for typing complicated and difficult to remember access codes For a user of a mobile telephone system, an additional state "Unregistered" is introduced to account for the registration status of the mobile user. Preferably, a user of a mobile telephone system should be able to set to a longer value for T than a PSTN user.

DETAILED DISCUSSION OF THE INVENTION

The system according to the invention for publishing presence or availability of a user of a legacy telephone system to an Internet presence service (Presence Publishing System or PPS for brevity) will now be explained in more detail with reference to the enclosed drawings in which.

Figure 1:
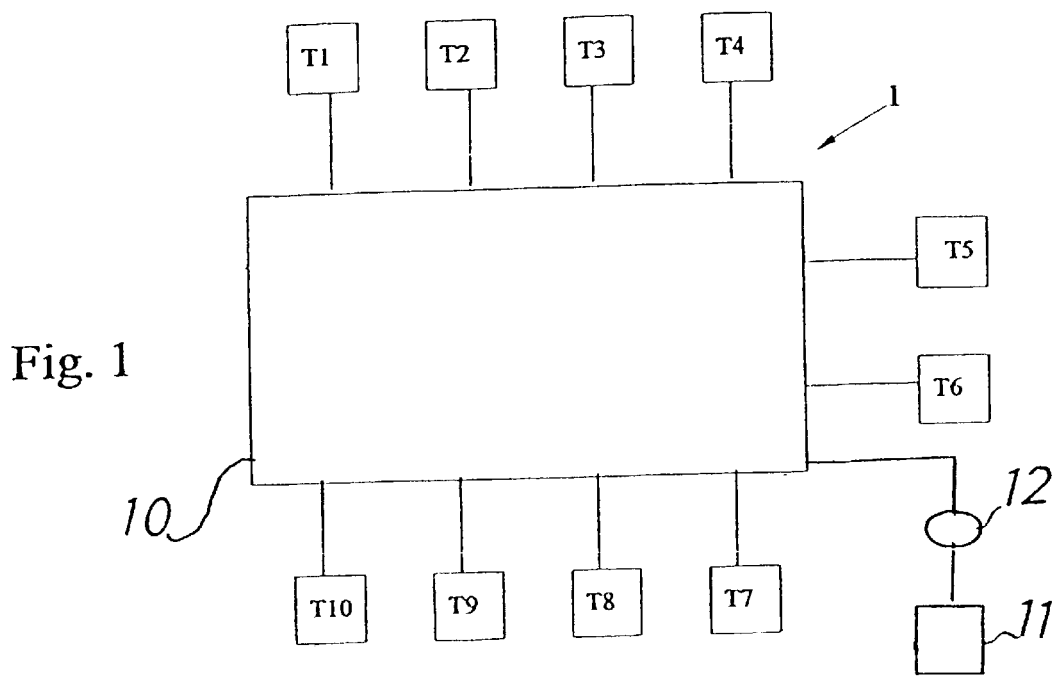
FIG. 1 is a diagram of a system according to the invention.

Specifically, FIG. 1 is a diagrammatic representation of a system 1 according to the invention comprising a legacy telephone system 10. A plurality of terminals ($T_1 \ldots T_{10}$) is connected with legacy telephone system 1, at least some of which, e.g. $T_1$, $T_2$, are subscribers to the availability service provided by the invention. Legacy telephone system 10 is connected via a gateway 12 with at least one presence system, e.g. a presence service of an Internet.

Gateway 12 may be used to run an availability service program for implementing operation of the availability service according to the invention; this special program is designed to continuously monitor each subscriber terminal $T_1$, $T_2$ for a change of a connect status of the subscriber terminal from high availability to availability unknown and for causing transmission of a status change signal when such change happens; further the program is designed to register the preselected period of time τ for terminating the availability signal.

Figure 2:
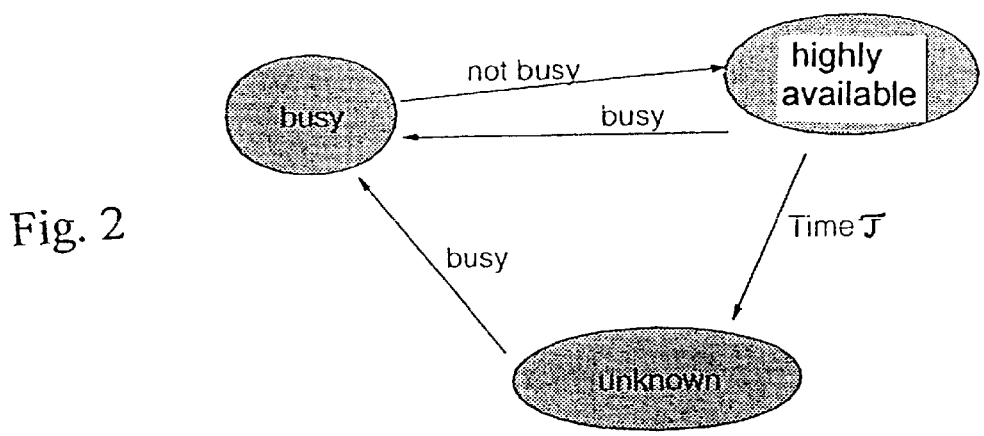
FIG. 2 is a transition diagram showing the presence status of a PSTN user.
Figure 3:
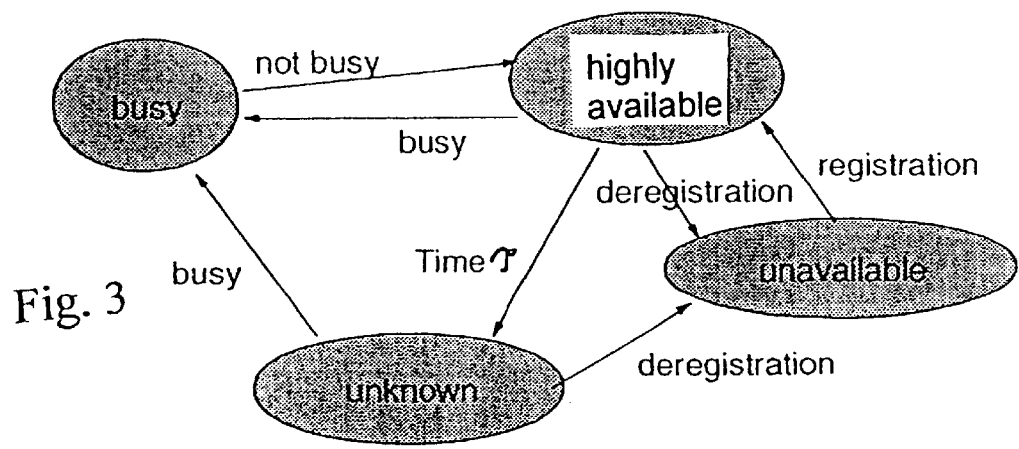
FIG. 3 shows the presence status of a mobile telephone user.

FIG. 2 shows the transition diagram of the presence status of a PSTN user while FIG. 3 shows the presence status of a mobile telephone user. A new state "Unregistered" is introduced to account for the registration status of the mobile user. Another difference is the value of τ which can be set to a longer value than the one of PSTN user.

The advantage of the presence or availability status so defined is that the user can influence his status via a very simple interface: he can move his status to the state "high availability" by picking up his telephone handset briefly, and there is no need for typing complicated and difficult to remember access codes.

Figure 4:
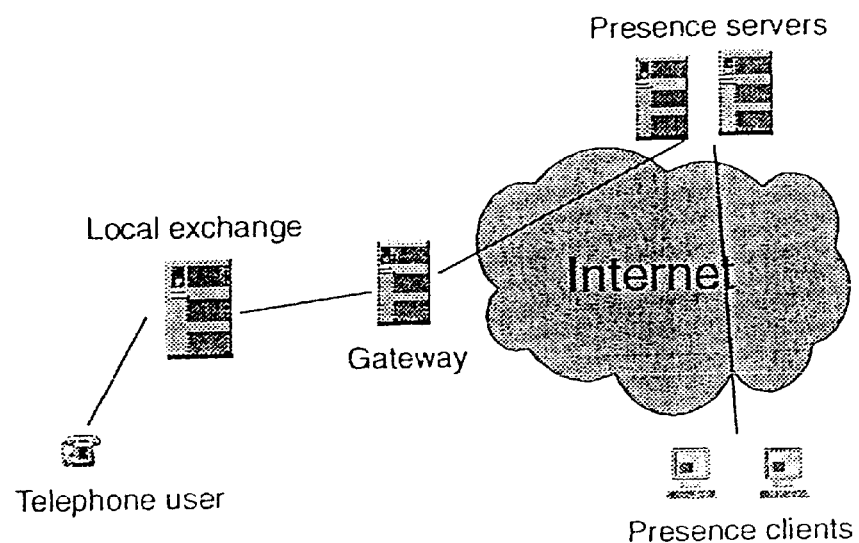
FIG. 4 illustrates the components of a PPS according to the present invention.

FIG. 4 illustrates the components needed for publishing the presence information of a telephone user to an Internet presence service. Assuming the existence of an Internet presence service consisting of:

multiple presence servers for the storage and distribution of presence information, and multiple presence clients publishing and accessing presence information to and from the server. The specification of such a presence service(s), in particular of the necessary client-server and server-server protocols, is known to those experienced in the art and needs no further elaboration. Further, reference is made to the cross-referenced, co-pending patent application Ser. No. 09/855,303, entitled, "Teleconferencing System and Method." The general essential requirement for such a presence service is that it has to be able to support the kind of presence or availability information defined herein.

Further, assuming that the local exchange—to which the subscribed telephone user is attached—is involved by providing the following functions:

to constantly monitor the status of the telephone users attached to it, and to indicate to the "gateway" the events "not busy" (not active) and "busy" (active).

Based on the events received from the local exchange, the gateway will construct the presence status of a telephone user as specified in FIG. 2. It is to be noted that timer is shown as being implemented in the gateway to simplify the functions of the local exchange. This, however, is not a critical requirement and the timer could well be implemented in another part of the system e.g. the module referred to above.

Furthermore, the gateway will publish that presence status to Internet presence servers, for example by using the protocols of that specific Internet presence service.

An Internet user can now use a presence client to access the presence or availability information of a legacy telephone user stored in the presence servers. Based on this information it will then decide when to make a telephone call to the telephone user, e.g. only when the telephone user is in state of "high availability".

It is to be noted further in this context that the legacy telephone user can control and determine where and by whom (or by which terminal) his presence or availability information may be observed. For example, this can be achieved by a suitable Internet presence client. The exact way of achieving this specific goal, however, is not believed to be an essential feature of the present invention.

A system similar to the one illustrated in FIG. 4 and explained above can also be defined for mobile users and could include the following differences/enhancements:

the local exchange is replaced by the mobile switching system including the base stations;

the presence information of a mobile user is as illustrated in FIG. 3;

the mobile switching system additionally reports to the gateway the events "registration" and "de-registration".

The system and method according to the invention can also be implemented such that the local exchange is not involved, i.e. it is transparent to the system according to the present invention.

Figure 5:
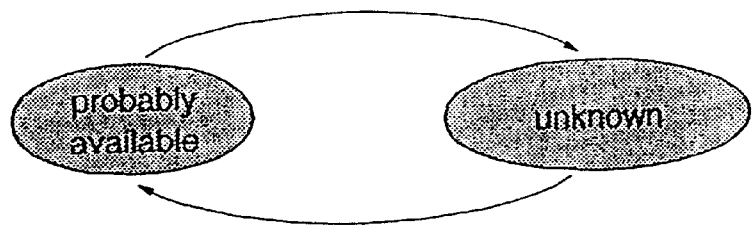
FIG. 5 illustrates a shift of the availability status.

The system components needed are the same as the ones in FIG. 4, with the difference that the local exchange does not provide to the gateway the events "not active" (same as "not busy") and "active" (same as "busy"). Without those two pieces of information, the presence information of a telephone user needs be reduced, for example to the states illustrated in FIG. 5.

Furthermore, the telephone user himself notifies the gateway about his status change. Various means are known to those experienced in the art and the following examples represent a non-limiting selection.

EXAMPLE 1

The user just dials the gateway, hears the ringing tones for a few times and hangs up. The gateway does not answer the call, but can derive who is calling from the calling party number included in the incoming SETUP message and marks the corresponding user as "probably available". The transition to "unknown" is triggered by a time-out and/or by a special code dialed by the user.

EXAMPLE 2

The user dials the gateway, waits until the gateway answers the call, and dials (e.g. via DTMF) a certain identification code. Based on the received identification code, the gateway can determine which user to be marked as "probably available". Again the transition to the state "unknown" can be triggered by a time-out and/or by a special code dialed by the user. Furthermore from the calling number included in the SETUP message the gateway can publish to the Internet presence service the telephone number under which the user can be actually reached. Thus the method adds a certain "mobility" dimension to the service.

EXAMPLE 3

In this example, the methods of Example 1 and 2 are combined as follows:

A user employs the method of Example 1 if he is at home; his home phone number is registered as default in the gateway. Otherwise, he employs the method of Example 2 if he wants to be reachable under another number.

EXAMPLE 4

An ISDN or mobile telephone user can use the SMS service to communicate with the gateway instead using the "inconvenient" DTMF method as described in example 2 above. In this case, it is possible that—in addition to his identification code—the user could also send a short message to the presence server if this feature is supported (it being noted that most current presence servers do not support that feature).

That message will then be distributed to all users who have subscribed to the presence information of the telephone user. An example for such a message is "I'm reachable only until 10:30".

It is further to be noted that the reduced presence information illustrated in FIG. 4 can also be implemented by a system according to the first alternative discussed above.

In this case, either the gateway function is integrated into the local exchange; in this case, a user needs only to dial the special codes for enforcing the state transitions), or the local exchange just relays further the user's inputs to the gateway.

While the invention has been disclosed above by means of specific embodiments, it is to be emphasized that the scope of the invention is not limited to such embodiments, and that the scope of the present invention is to be construed on the basis of the attached claims.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context is meant to include any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method comprising operating an availability service in a telecommunication system interconnecting a legacy telephone system with at least one presence system, said legacy telephone system including a plurality of terminals ($T_1 \ldots T_{10}$), at least some ($T_1, T_2$) of which are terminals of subscribers to said availability service, including the steps of:

(a) continuously monitoring each subscriber terminal ($T_1$, $T_2$) for a change of a call status of said subscriber terminal from the presence of a call to the absence of a call;

(b) generating a first or "high availability" signal when said call status of said subscriber terminal changes from said presence of a call into said absence of a call;

(c) monitoring an interval of time beginning with said first signal;

(d) generating a second or "availability unknown" signal after a predetermined time period τ within said interval; and (e) making said availability signals accessible to any interconnected presence system.

2. The method of claim 1, wherein said legacy telephone system is connected with the at least one presence system by means of a gateway, said method further including (f) said gateway accepting telephone calls from said subscriber terminals; and (g) generating said first or "high availability" signal when receiving a telephone call from said subscriber terminal.

3. The method of claim 1, wherein said legacy telephone system is connected with said at least one presence system by means of a gateway, said method including (h) said gateway accepting telephone calls and receiving DTMF signals from said subscriber terminals;

(i) generating said first or "high availability" signal when receiving a telephone call and a subscriber identification code in the form of DTMF signals from said subscriber terminal.

4. The method of claim 1, wherein said legacy telephone system is connected with said at least one presence system by means of a gateway, said method including (j) said gateway accepting SMS messages from said subscriber terminals;

(k) generating said first or "high availability" signal when receiving an SMS message from said subscriber terminal.

5. The method of any of claim 1, wherein a subscribed user of said legacy telephone system defines said predetermined time period $\tau$ within said interval.

6. A system for of operating an availability service in a telecommunication system interconnecting a legacy telephone system with at least one presence system, said legacy telephone system including a plurality of terminals ($T_1 \ldots T_{10}$), at least some ($T_1, T_2$) of which are terminals of subscribers to said availability service, said system including:

(A) first means for continuously monitoring each subscriber terminal ($T_1, T_2$) for a change of a call status of said subscriber terminal from presence of a call into absence of a call;

(B) second means for generating a first or "high availability" signal when said call status of said subscriber terminal changes from said presence of a call status into said absence of a call status;

(C) third means for monitoring an interval of time beginning with said first signal;

(D) fourth means for generating a second or "unknown availability" signal after a predetermined time period $\tau$ within said interval; and (E) fifth means for making said availability signal accessible to any interconnected presence system.

7. The system of claim 6, comprising at least one gateway for interconnecting said legacy telephone system with any interconnected presence system.

8. The system of claim 6, wherein at least one gateway is provided for connecting said legacy telephone system with any interconnected presence system.

9. The system of claim 8, wherein said gateway includes a program for implementing said availability service.

10. An availability service program for implementing operation of an availability service in a telecommunication system interconnecting a legacy telephone system with at least one presence system, said legacy telephone system including a plurality of terminals ($T_1 \ldots T_{10}$), at least some ($T_1, T_2$) of which are terminals of subscribers to said availability service, said program being designed to continuously monitor the presence or absence of a call for each subscriber terminal ($T_1, T_2$), to generate a "high availability" signal when a call terminates and to generate a "unknown availability" signal at the end of a predetermined period of time $\tau$.

11. A module for operating an availability service in a telecommunication system interconnecting a legacy telephone system with at least one presence system, said legacy telephone system including a plurality of terminals ($T_1 \ldots T_{10}$), at least some ($T_1, T_2$) of which are terminals of subscribers to said availability service, said module including:

(A) first means for continuously monitoring each subscriber terminal ($T_1, T_2$) for a change of call status of said subscriber terminal from the presence of a call into the absence of a call;

(B) second means for generating a first or "high availability" signal when said call status of said subscriber terminal changes from said presence of a call status into said absence of a call status;

(C) third means for monitoring an interval of time beginning with said first signal; and (D) fourth means for generating a second or "unknown availability" signal after a predetermined time period $\tau$ within said interval.

12. An article of manufacture comprising a computer usable medium having computer readable program code means embodied therein for causing operation of an availability service in a telecommunication system, the computer readable program code means in said article of manufacture comprising computer readable program code means for causing a computer to effect the steps of claim 1.

* * * * *